Inventor.
Harry Lee Corwin.
Attorney.

Inventor:
Harry Lee Corwin.
Attorney.

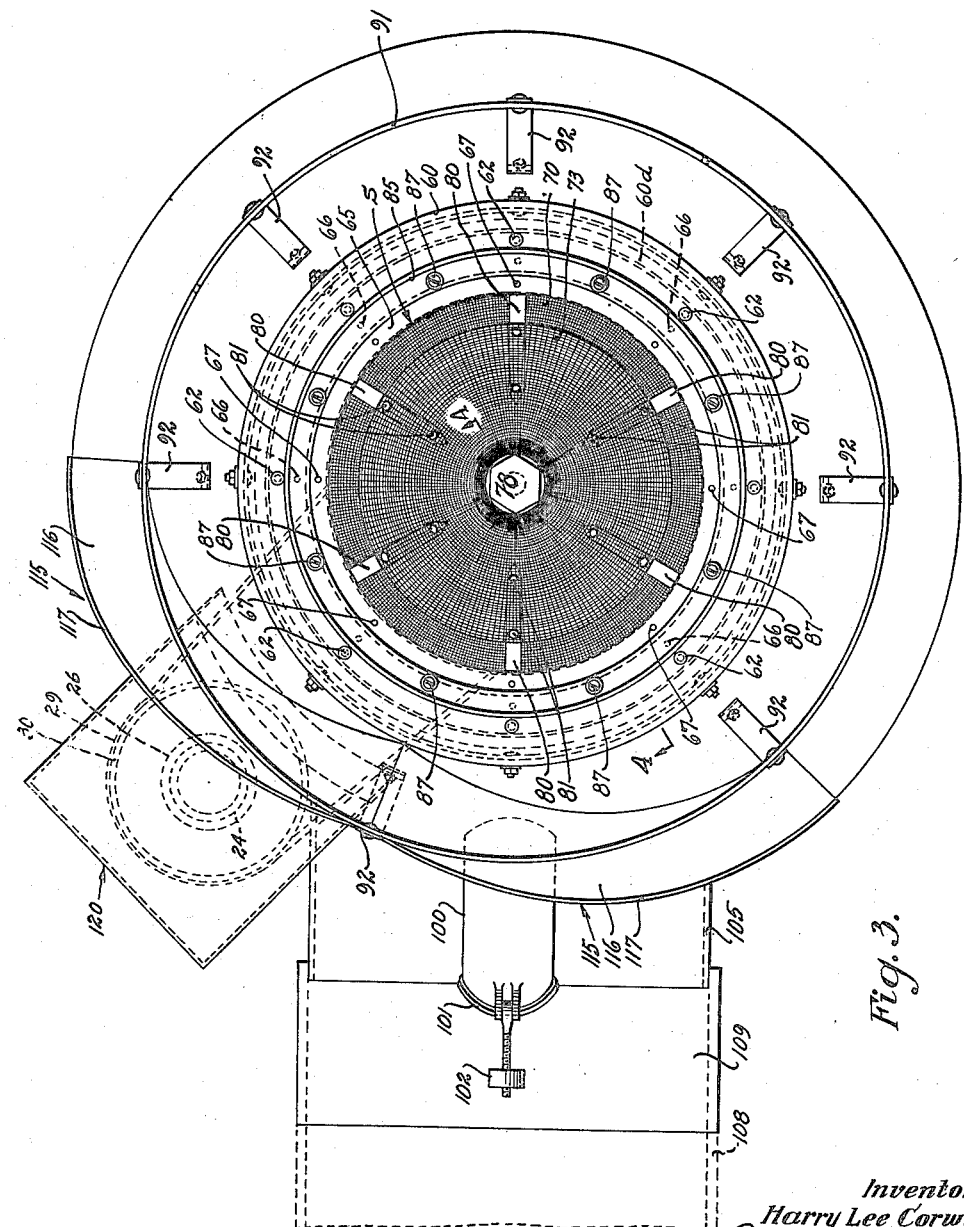

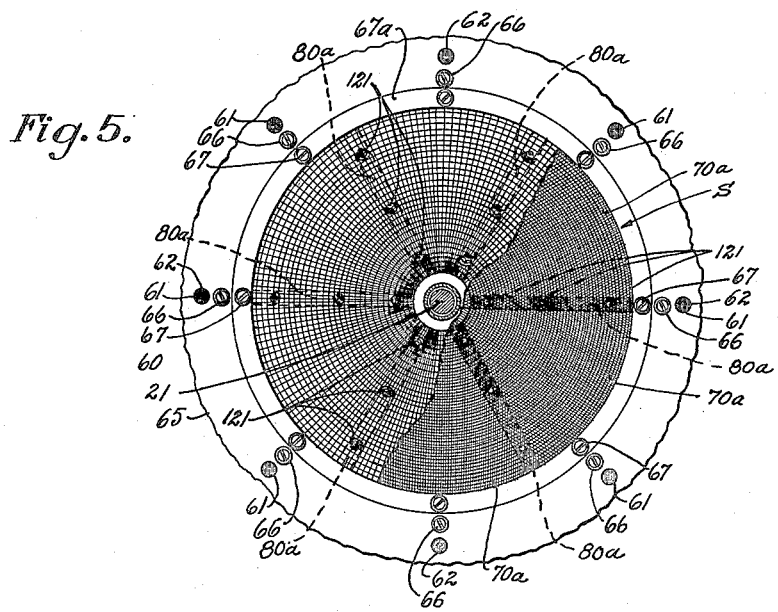
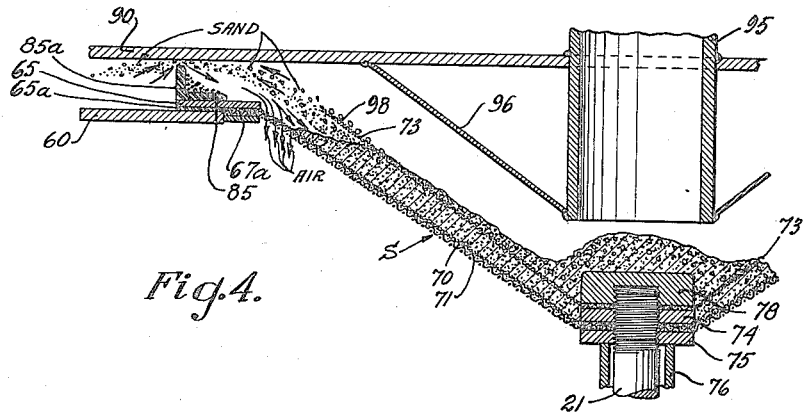

Patented Apr. 29, 1941

2,239,992

UNITED STATES PATENT OFFICE 2,239,992

CENTRIFUGAL SEPARATOR

Harry Lee Corwin, Los Angeles, Calif., assignor to Vernon Tool Co. Ltd., Los Angeles, Calif., a corporation of California Application March 16, 1938, Serial No. 196,216

9 Claims. (Cl. 210—66)

This invention relates generally to centrifugal separators, and is more particularly concerned with centrifugal separators designed especially for separating sand and rock cuttings from "rotary mud" used for commonly understood purposes in rotary oil well drilling. However, while the invention has features relating especially to the separation of "rotary mud" from sand and rock cuttings, and is herein illustratively shown in a form adapted particularly to that specific use, it will be understood that the invention is not necessarily limited to use with the specific materials mentioned but may be applied advantageously to the separation of other materials.

A general object of the present invention may be stated to be to provide a centrifugal separator of large capacity capable of effecting a comparatively high degree of separation between such typical substances as rotary mud and sand or rock cuttings.

As is well known, "rotary mud" consists of a fine, light mud including a proportion of mineral substances, and this mud as so constituted is of such value that after it is received from the well, filled with sand and rock cuttings, it becomes desirable to recover or separate it from the cuttings for use over again. Centrifugal separators have previously been employed for this purpose, but the separation has not been satisfactorily complete.

Previous centrifugal separators of the general type in question have involved a rotating conical screen within which the material from the well is discharged, the mud being intended to pass through the screen, and the cuttings to be thrown out over the edge of the screen by centrifugal action. In separators of this type, however, a large proportion of the liquid mud (water and suspended finely divided mud particles) flows up the screen and passes off with the cuttings. In accordance with the present invention, this flow of the liquid mud up the screen and over its upper edge with the cuttings is prevented by establishing a counter-flow of air, which holds the liquid mud back and causes it to pass much more completely through the screen. This counter-flowing air also passes through the screen, and thereby aids materially in forcing the mud to pass downwardly through the screen.

With this preliminary discussion in mind, the various objects, features and advantages of the invention will be made most apparent by now referring to the following detailed description of a present preferred embodiment thereof, reference for this purpose being had to the accompanying drawings, in which:

Fig. 3 is a plan view of Fig. 1 but with the cover member removed;

Fig. 4 is an enlarged section taken on line 4—4 of Fig. 3; and

Fig. 5 is a view taken as indicated by line 5—5 of Fig. 1, but showing a modification.

Figure 1:
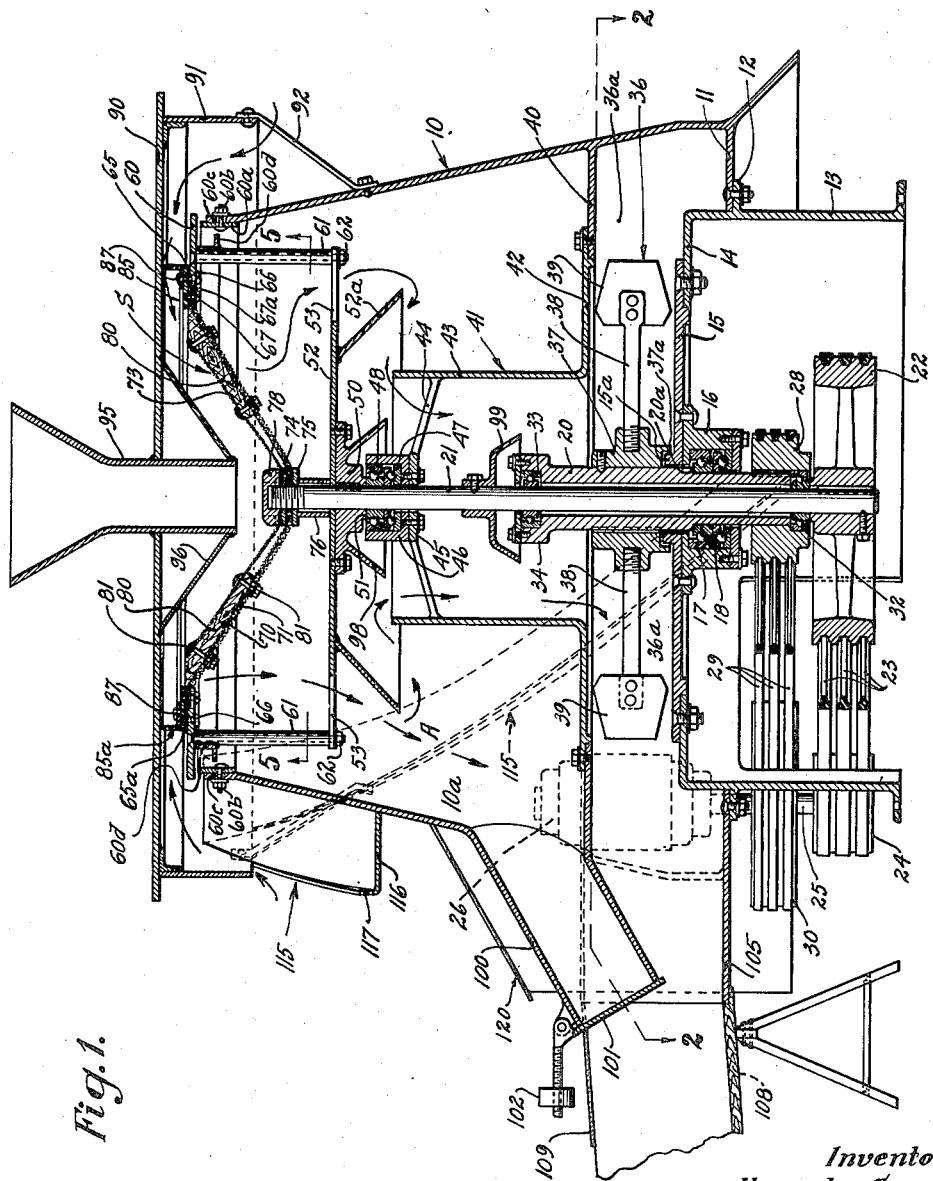
Fig. 1 is a vertical central section through a typical machine embodying the present invention.

In the drawings numeral 10 designates generally a rounded casing, which converges somewhat in an upward direction as illustrated. This casing 10 has near its lower end an inwardly extending annular flange 11, which rests on and is bolted to an annular flange 12 on an annular or cylindrical base member 13 adapted to rest on suitable flooring, not illustrated. The upper end of base member 13 has an inwardly extending annular flange 14, to which is bolted a circular plate 15, the latter having secured to its underside, in a central position, a bearing housing 16 containing radial and thrust bearings 17 and 18 for a central, vertically disposed hollow drive shaft 20 for a later described fan. Shaft 20 is provided with a downwardly facing shoulder at 20a which rests on the inner race ring of radial bearing 17, the latter being supported by thrust bearing 18, in the manner clearly illustrated in Fig. 1.

Figure 2:
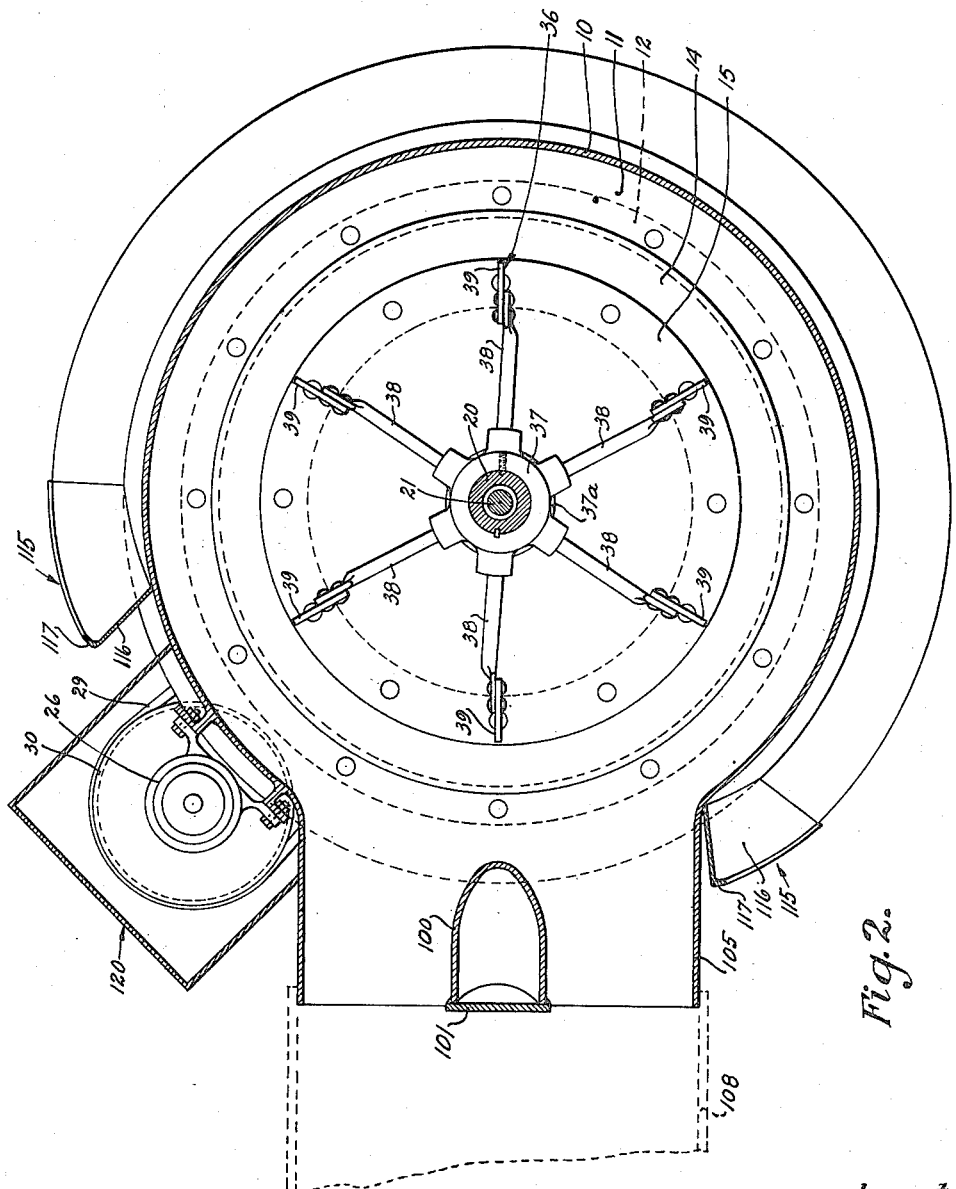
Fig. 2 is a section taken on line 2—2 of Fig. 1.

Extending through hollow shaft 20 is a vertical drive shaft 21 for a rotating separating screen assembly S, shaft 21 having secured on its lower end a pulley 22 driven by V-belts 23 from a pulley 24 on the lower end of a shaft 25 driven by electric motor 26, motor 26 being bolted on the side of casing 10 as indicated in Fig. 2. The lower end of hollow shaft 20 carries a pulley 28, driven by V-belts 29 from a pulley 30 on shaft 25 between pulley 24 and motor 26. The relative diameters of the described belt pulleys are such that hollow fan shaft 20 is rotated at several times the speed of screen assembly shaft 21. A radial bearing 32 is provided between shaft 21 and pulley 28 below the lower end of hollow shaft 20, while a similar bearing 33 is seated in an enlargement 34 at the upper end of hollow shaft 20 and supports hollow shaft 20 about shaft 21 at that point. Bearings for the upper end of shaft 21 are described later.

Blower means are provided for establishing a flow of air against the material within the separator screen, and while this blower means may be associated with the separator in various ways, it is preferably and conveniently located inside the separator casing; as here typically shown, this blower means is in the form of a suction fan 36 mounted on hollow shaft 20 just above plate 15 and embodying a hub 37 secured to hollow shaft 20 and a series of radial arms 38 carrying fan blades 39.

Casing 10 has, at an elevation just above fan 36, an inwardly extending annular flange 40, on which is mounted a structure 41 consisting of a horizontal annular flange portion 42 resting on and bolted to flange 40, and a vertical cylindric portion 43 extending in an upward direction from flange portion 42, and which forms the air inlet to the fan chamber defined by walls 15 and 42. A spider member 44 extends inwardly from cylindric portion 43, and has a flat, central portion 45 surrounding shaft 21, on which is mounted a cup 46 housing a thrust bearing 47 and a radial bearing 48 for central drive shaft 21, the lower race ring of thrust bearing 47 resting on the bottom of the cup, and the inner race ring of bearing 48 resting on the upper race ring of bearing 47, as clearly illustrated.

A screen assembly carrying head 50 is keyed on shaft 21 just above bearing 48, its reduced lower end 51 resting downwardly on the inner race ring of bearing 48 as illustrated. Mounted on the flat upper side of head 50 is a flat horizontal plate 52 having a plurality of horizontally extending arms 53. A depending conical deflector skirt 52a is welded to the underside of plate 52 and extends downwardly below and outside the upper end of cylindric riser 43. A flat screen-supporting annulus 60 is mounted over plate 52, being supported from arms 53 by means of vertical sleeves 61 placed between arms 53 and annulus 60 and connecting screws 62. The underside of the outer edge portion of annulus 60 is comparatively closely spaced above the upper edge of a ring member 60a mounted in the upper end of casing 10, so as to seal against substantial entry of air between said members under the influence of a depression of pressure inside the casing established as later to be mentioned. Ring member 60a is preferably vertically adjustable in the upper end of casing 10, as here shown being secured in adjusted position by bolts 60b passing through elongated slots 60c in the casing wall.

Mounted on the inner edge of annulus 60 is a flat ring 65, screws 66 securing the latter in position, and a gasket 65a being positioned between ring 65 and member 60. Secured to the underside of the overhanging inner edge of ring 65, as by means of screws 67 and a clamp ring 67a, are the upper outer edges of a pair of conical screens 70 and 71. These screens 70 and 71, which are in contact with one another, extend downwardly (conically) from mounting ring 65 at an angle typically of substantially 30 degrees, to a mounting on the upper end of drive shaft 21. Thus, as here shown, screens 70 and 71 are received at their lower inner edges between a pair of washers 74 and 75 encircling drive shaft 21 and spaced above plate 52 by a spacing sleeve 76. The assembly is held down and the inner edges of the screens clamped by means of a nut 78 screw-threaded on the upper end of drive shaft 21.

Another conical screen 73 is used, being spaced a short distance above screen 70 and being preferably arranged at an angle slightly steeper than that of screens 70 and 71. As here shown, the lower inner edge of screen 73 is clamped between nut 78 and washer 74. This screen 73 is supported on a plurality of radially extending members 80 which I may term wickers, the latter, which may if desired be formed of wood, being mounted on screens 70 and 71 by means of screws or bolts 81, and extending from the plane of the lower surface of ring 65 preferably well down the screens. Upper screen 73 is mounted on the upper edges of these wickers 80, being secured in place by means of the aforementioned bolts 81. The height and shape of wickers 80 is such that upper screen 73 mounted thereon is slightly steeper than screens 70 and 71; for instance, screen 73 may preferably be approximately six degrees steeper than screens 70 and 71.

Upper screen 73 is a coarse screen or grizzly, designed to take out the coarser cuttings, and may be, for instance, of $\frac{3}{16}$" mesh. Lower screen 71 is a coarse supporting screen, which may be of $\frac{3}{16}$" or $\frac{1}{4}$" mesh, its function being simply to serve as a support for the separating screen 70 which lies immediately above it. Screen 70 is a fine mesh screen, for instance 30 and 40 mesh.

It may here be noted that while I refer to the screens as being conical in shape, and that formation is preferred because of its simplicity, the screens need not necessarily be strictly conical in a straight-sided sense, but need only be dish-shaped, so that the granular material will be thrown up and out by centrifugal action. It is accordingly to be understood that whenever the expression "conical" is used herein or in the claims, the meaning is that the screens are conical, or substantially conical or dish-shaped, unless otherwise indicated. Neither need they be strictly conical in the sense of being a true surface of revolution; they may be polygonal as viewed in plan.

A comparatively flexible rubber ring 85 of angle section, is mounted on the outer portion of ring 65, the upstanding flanged portion 85a of said ring being spaced comparatively closely, for example $\frac{1}{2}$", from a horizontal cover plate 90 later to be described. Ring 85 is secured to ring 65 as by means of screws 87. Cover plate 90 is removably mounted on the upper edge of a cylindrical member 91 supported by a plurality of bracket arms 92 extending outwardly from casing 10.

The rotary mud as it comes from the well, with the cuttings which it carries, is introduced to the separator by way of a vertical inlet pipe 95 extending downwardly through a central opening in cover plate 90, the lower end of pipe 95 discharging centrally within upper conical screen 73. A conical shell 96 extends outwardly and upwardly from the lower end of inlet pipe 95, approximately parallel to screen 73, being welded at the bottom to pipe 95 and at the top to cover 90. This shell serves not only to support pipe 95, but also to reduce the cross sectional area of the air channel above the screens, to deflect the incoming air current downwardly against the material on the screens, and to limit the depth of material on the screens.

The conical screen assembly mounted on the upper end of drive shaft 21 as well as fan 36 will be understood to be rotated constantly by means of motor 26 and the previously described driving gear. The material introduced to the separator by way of pipe 95 is partially separated by coarse screen 73, which removes rock particles of sizes larger than will pass readily through its approximately $\frac{3}{16}$" mesh. These relatively larger rock particles are thrown upwardly and outwardly on screen 73 by centrifugal action, being discharged past flexible flange 85a, which, acting as a flap, flexes to pass the larger rock particles. The finer material passes through screen 73 to the space between the latter and fine screen 71, where the main separation is effected. The mud and sand conglomerate is picked up and set into rotation by wickers 80, and as it rotates, is thrown upwardly and outwardly on fine screen 70. The wickers serve the purpose of throwing the introduced material quickly into rotation, thereby reducing wear of the sand on the fine screen. The angle of the conical screen was previously stated to be typically 30°. However, this is not to be taken in a limitative sense but only as illustrative of one embodiment of the invention. In general, it may be stated that the screen should be as flat as possible, in order to reduce wear of the sand on the screen, and also for ease of throwing out of the sand, but it should not be so flat as to cause the liquid mud to be thrown out along with the sand.

There is nevertheless, however, a strong tendency for a large part of the material, liquid mud as well as the sand, to be thrown up and off the screen without separation being effected, that is, without the mud passing downwardly through the fine screen as intended. In particular, liquid mud tends to creep upwardly past the upper, outer edge of the fine screen, over ring member 65, and to go out past flap 85a with the sand, and finely divided particles of liquid mud are also thrown outwardly from the mass of material rotating on the screens. This loss of liquid mud is prevented, in accordance with the present invention, by establishing a flow of air counter to the travel of the material up and off the screen. Thus, in the form of the invention here shown, fan 36 draws air in under the lower edge of casing member 91 and over the upper edge of flexible ring member or flap 85a, as indicated by the arrows in Fig. 1. The clearance space between flap 85a and cover 90 is made relatively small so as to increase the velocity of the incoming air at that point, thereby keeping back liquid that tends to be thrown out with the sand and other heavy particles. The flap serves not only to increase the air velocity by constricting the air passage, but also presents a shoulder which in itself tends to stop the outward movement of liquid mud. The current of air, having passed flap 85a, is drawn downwardly through screens 70 and 71, passes between arms 53 of supporting member 52, thence downwardly around and under conical skirt 52a and is then drawn upwardly under skirt 52a and then downwardly through cylindric riser 43 to fan chamber 36a, in the path indicated by the arrows in Fig. 1. It will be noted that the mud, as well as the air, coming from the screen is discharged through the openings between arms 53 outside riser 43, the air current travelling in a loop-shaped path so as to tend to throw out the suspended liquid mud particles which it carries at A. Riser 43 thus serves two purposes, first, in preventing the discharged mud from going into the fan, and second, in constraining the air to travel in a loop-shaped path, so as to throw out the mud within chamber 10a.

The air passing downwardly through screen 70 blows against the material being thrown up on the latter, tending to hold it back and causing the mud and liquid to pass downwardly through the screen. Fig. 4 illustrates the condition within the separator during operation. It will be noted that the main air current passes downwardly through the outer portion of the fine screen, effectively preventing creepage of liquid from the screen upwardly over ring member 65. The shoulder presented by the inner edge of member 65 also tends to curtail this creepage of liquid. The current of air has a differential action, tending strongly to hold back the liquid mud while allowing the heavier particles of material to be thrown out. Thus after the sand and cuttings leave the upper surface 98 of the mass of material between the screens it is effectively dried, because the air current holds back the liquid it would otherwise carry with it. The outwardly thrown material thus passes over flap 85a, against the current of air, to be finally discharged from the separator as later to be described in more detail.

Thus, the coarser material taken out by coarse screen or grizzly 73, together with the finer sand thrown out from the mass of material rising on fine screen 70, are thrown outwardly over flexible flap 85a, while the current of air passing inwardly over flap 85a keeps back liquid mud otherwise discharging over the flap with the sand, prevents creepage of liquid from the screen upwardly over ring member 65, and impacts the material against fine screen 70 to force the liquid mud to pass through it. The air flowing downwardly through the upper, outer portion of the screen also forces the liquid mud to pass downwardly through that part of the screen. In fact, even if the principal air flow into the separator should occur as by way of material inlet pipe 95 rather than over flap 85a, this flow of air downwardly through the outer or peripheral portion of the screen carries sufficient liquid mud with it to effect a high degree of separation.

The effectiveness of the air flow established in the manner described above is such that the sand discharged from the separator is extremely dry, nearly the whole of the recoverable mud passing downwardly through the screen.

The rock cuttings and sand thrown outwardly over flap 85a pass out of the machine over the outer periphery of rotating ring member 60, being discharged from the latter downwardly between the side wall of the exterior casing and the overhanging cover plate flange 91.

The current of air passing through cylinder 43 to the fan chamber carries a certain proportion of finely divided liquid mud, which is recovered in a manner presently to be described. To prevent this mud from reaching bearings 47 and 48, an overhanging conical deflector shield 98 is formed on head 50, and for protection of bearing 33, an overhanging deflector skirt 99 is mounted on shaft 21 immediately above said bearings. Mud is prevented from reaching bearings 17 and 18 by a flange 15a on plate 15, protected by overhanging flange 37a on fan hub 37. A guard ring 60d is preferably mounted below plate 60, outside of studs 61, to prevent water or mud from being thrown out through the clearance space between the upper edge of ring 60a and plate 60.

The separated mud is delivered from the interior chamber 10a of the separator casing by way of a discharge chute 100 normally closed by a counter-weighted flap valve 101, as clearly illustrated in Fig. 1. Valve 101, held normally closed by its counter-weight 102, opens only sufficiently wide to discharge the mud, and therefore seals against entry of air by way of chute 100 such as would otherwise reduce the velocity of air flow over flap 85a and through the screen.

Casing 10 is formed, immediately below chute 100, with a fan chamber air outlet 105, the walls forming this outlet being integrally joined with mud discharge chute 100, which, as illustrated, extends downwardly within air outlet 105. Mud chute 100 and air outlet 105 discharge to the ingoing end of a trough 108, which is provided with a cover 109 extending a distance beyond chute 100, as indicated. Thus the air drawn into the machine by fan 36 and discharged by way of outlet 105, flows under mud chute 100, and is caused to intermingle with the discharging mud before it is permitted to escape from the trough, with the result that any finely divided particles of liquid mud carried by the air current are caught by the mud in the trough, effecting a desirable saving.

Preferably, the mud and air discharge trough is located adjacent electric drive motor 26, and a sand deflector shield 115 is provided to deflect the discharged sand and prevent it from coming down on both the trough and motor. This sand shield 115 comprises a pair of inclined plates 116, of widths equal to the spacing between casing 10 and member 91, mounted on the casing and meeting at the top to form an apex at an elevation just below the annular plate 60 over which the seperated sand is thrown out, and extending downwardly on opposite sides of the space occupied by the motor and trough. These plates, which are formed on their outer edges with upwardly turned flanges 117, form troughs which catch and guide sand thrown out over the peripheral extent of the casing covered thereby and convey and discharge said sand beyond the motor and mud trough. Preferably, the electric motor 26 is further protected by a cover-member 120 secured to casing 10.

Fig. 5 is a view taken on line 5—5 of Fig. 1, but showing a modification. Fine screen 70 is here shown as made up in sections 70a between wickers 80a, which in this instance extend the full distance down to the center washer 74 that holds the screens down. The several screen sections are overlapped on wickers 80a and secured thereto as by screws 121.

It is to be understood that the drawings and description are simply illustrative of one practical embodiment of the invention, and that various changes in design, structure and arrangement may be made without departing from the spirit and scope of the invention or of the appended claims.

I claim:

1. In a separator, the combination of a casing, a conical screen member rotatably mounted in said casing, a cover member mounted in spaced relation over said conical screen member, said cover member having a restricted opening through which materials may be introduced to said screen, and said cover member defining an air space over said screen member that is closed except for said restricted materials opening and for a restricted peripheral opening leading inwardly over the periphery of the screen member, and a suction fan for reducing the air pressure below said conical screen and thereby causing a flow of air between said cover and the peripheral edge of said screen and against the material on said screen, in a direction contra to the direction in which material tends to be thrown from said screen by centrifugal action, and thence downwardly through said screen.

2. In a separator, the combination of a casing, a conical screen member rotatably mounted in said casing, means for introducing material to said screen, a closure mounted in spaced relation over said conical screen, a flexible annular flap extending upwardly from the screen member to an elevation just below said closure, said flap acting to restrict the area of the air admission passageway to the interior of the screen, and being adapted to flex to pass materials thrown outwardly from said conical screen by centrifugal action, and a suction fan for reducing the air pressure below said conical screen and thereby causing a flow of air between said flap and closure and against the material on said screen, in a direction contra to the direction in which material tends to be thrown from said screen by centrifugal action, and thence downwardly through said screen.

3. In a separator, the combination of a rotatable conical screen member, means for introducing material to said screen member, a casing defining a substantially closed chamber below said screen member, a closure disposed over the screen member, said closure closing with said material introducing means and defining an air space over said screen member that is closed except for said material introducing means, and except for a restricted annular passage between said closure and the peripheral edge of said screen for admission of air to the space between said closure and screen, and a suction fan for reducing the air pressure below said conical screen and thereby causing a flow of air inwardly through said air admission passage and downwardly through said screen.

4. In a separator, the combination of a rotatable screen assembly comprising an annular screen carrying member, a conical screen supported at its periphery by said annular member, means for rotating said annular member and screen, means for feeding material to the interior of said conical screen, a casing having its upper portion disposed closely adjacent said annular member and defining a chamber below said conical screen, a suction fan for reducing the air pressure in said chamber below said screen, whereby air is drawn downwardly through said screen, and a closure mounted in spaced relation over said screen, said closure extending over the entire otherwise open area above said screen and approaching relatively closely to the periphery of said screen in a manner to confine the admission of air to the space between said closure and screen to a path extending inwardly over the peripheral edge of said screen contra to the direction in which material tends to be thrown from said screen by centrifugal action.

5. In a separator, the combination of a rotatable screen assembly comprising an annular screen carrying member, a conical screen supported at its periphery by said annular member, means for rotating said annular member and screen, a conduit for feeding material to the interior of said conical screen, a casing having its upper portion disposed closely adjacent said annular member and defining a chamber below said conical screen, a suction fan for reducing the air pressure in said chamber below said screen, whereby air is drawn downwardly through said screen, and a closure mounted over said screen and, together with said conduit, extending over the entire area of said screen, and approaching relatively closely to the periphery of said screen, in a manner to confine the admission of air to the space immediately above said screen to a path of relatively small cross sectional area extending inwardly over said annular screen carrying member and over the peripheral edge of said screen contra to the direction in which material tends to be thrown from said screen by centrifugal action.

6. In a separator, the combination of a rotatable screen assembly comprising an annular screen carrying member, a conical screen supported at its periphery by said annular member, means for rotating said annular member and screen, means for feeding material to the interior of said conical screen, a casing having its upper portion disposed closely adjacent said annular member and defining a chamber below said conical screen, a suction fan for reducing the air pressure in said chamber below said screen, whereby air is drawn downwardly through said screen, a closure mounted in spaced relation over said screen, and a flexible annular flap mounted on said annular screen carrying member and extending upwardly to an elevation just below said closure, said flap acting to restrict the area of the air admission passageway to the interior of the screen, and being adapted to flex to pass materials thrown outwardly from said conical screen by centrifugal action.

7. In a separator, the combination of a rotatable screen assembly comprising an annular screen carrying member, a conical screen supported at its periphery by said annular member, means for rotating said annular member and screen, means for feeding material to the interior of said conical screen, a casing having its upper portion disposed closely adjacent said annular member and defining a chamber below said conical screen, a vertical drive shaft in said casing on which said conical screen and annular screen supporting member are mounted, a hollow drive shaft surrounding said first mentioned drive shaft, a suction fan mounted on said hollow drive shaft, walls in said casing forming a fan chamber and a conduit leading from the space below said conical screen to said fan chamber at the inlet side of said fan, an air discharge outlet leading from said fan chamber, and a material discharge outlet leading from the interior of the casing.

8. In a separator, the combination of a rotatable screen assembly comprising an annular screen carrying member, a conical screen supported at its periphery by said annular member, means for rotating said annular member and screen, means for feeding material to the interior of said conical screen, a casing having its upper portion disposed closely adjacent said annular member and defining a chamber below said conical screen, a vertical drive shaft in said casing on which said conical screen and annular screen supporting member are mounted, a hollow drive shaft surrounding said first mentioned drive shaft, a suction fan mounted for rotation in said casing concentrically with relation to said drive shaft, walls in said casing forming a fan chamber and a conduit leading from the space below said conical screen to said fan chamber at the inlet side of said fan, an air discharge outlet leading from said fan chamber, and a material discharge outlet leading from the interior of the casing.

9. In a separator, the combination of a casing, a conical screen member rotatably mounted in said casing, means for introducing material to said screen, a closure mounted in spaced relation over said conical screen, a flexible annular flap disposed between said screen member and said closure, said flap acting to restrict the area of the air admission passageway to the interior of the screen, and being adapted to flex to pass materials thrown outwardly from said conical screen by centrifugal action, and a suction fan for reducing the air pressure below said conical screen and thereby causing a flow of air between said flap and closure and against the material on said screen, in a direction contra to the direction in which material tends to be thrown from said screen by centrifugal action, and thence downwardly through said screen.

HARRY LEE CORWIN.